United States Patent
Grabenstaetter et al.

(10) Patent No.: US 7,218,718 B2
(45) Date of Patent: May 15, 2007

(54) METHOD TO PERFORM A TELECOMMUNICATION WITH DIALING DESTINATION PREVIEW

(75) Inventors: Bruno Grabenstaetter, Haguenau (FR); Jean-Luc Boussel, Illkirch (FR)

(73) Assignee: Alcatel, Paris (FR)

( * ) Notice: Subject to any disclaimer, the term of this patent is extended or adjusted under 35 U.S.C. 154(b) by 31 days.

(21) Appl. No.: 10/699,800

(22) Filed: Nov. 4, 2003

(65) Prior Publication Data

US 2004/0120490 A1 Jun. 24, 2004

(30) Foreign Application Priority Data

Dec. 18, 2002 (EP) .................................. 02360360

(51) Int. Cl.
*H04M 3/42* (2006.01)
(52) U.S. Cl. ................. 379/211.02; 379/186; 379/196; 379/197; 379/198; 379/199; 379/201.01; 379/201.02; 379/210.02; 379/212.01
(58) Field of Classification Search ................ 379/188, 379/196, 197, 198, 199, 201.01, 201.02, 379/210.02, 211.02, 212.01
See application file for complete search history.

(56) References Cited

U.S. PATENT DOCUMENTS 4,277,649 A * 7/1981 Sheinbein .............. 379/211.02
5,327,486 A * 7/1994 Wolff et al. .............. 379/93.23
5,509,062 A * 4/1996 Carlsen .................. 379/211.02
5,818,920 A * 10/1998 Rignell et al. ......... 379/211.02
6,442,266 B1 * 8/2002 Wu ........................ 379/211.02
2001/0024951 A1   9/2001 Rignell et al.

FOREIGN PATENT DOCUMENTS

WO    WO 9934628 A    7/1999

* cited by examiner

*Primary Examiner*—Quynh H. Nguyen
(74) *Attorney, Agent, or Firm*—Sughrue Mion, PLLC

(57) ABSTRACT

The present invention concerns a method to perform a telecommunication between a caller terminal and a callee terminal identified by an identification code, such as a phone number.

Method wherein it comprises the steps of: collecting routing information related to the identification code of the callee, after entering said code at the caller's terminal and before activating the telecommunication or establishing the telecommunication link, then displaying at least a part of said collected routing information at the caller's end, for example directly on the caller terminal and finally either activating the telecommunication in order to establish the telecommunication link corresponding to the entered code or cancelling the current attempt to establish a telecommunication link based on said dialed code.

10 Claims, No Drawings

METHOD TO PERFORM A TELECOMMUNICATION WITH DIALING DESTINATION PREVIEW

TECHNICAL FIELD

The present invention is related to the field of the telecommunications, more particularly the services rendered to customers using telecommunication terminals, such as phones, and concerns a method to perform a telecommunication with a dialing destination preview. The invention is based on a priority application EP 02 360 360.8 which is hereby incorporated by reference.

BACKGROUND OF THE INVENTION

It is common knowledge that, when dialing a phone number, the user never knows for sure which phone will ring because of different routing rules which can be applied to the dialed call, such as: immediate forwarding situation of destination, forwarding on busy situation of destination, "Do Not Disturb" situation of destination, call forwarding to private, cellular or general phone.

On a phone without a display, one only knows what the destination phone is after answer, at the callee's end, by asking the correspondent. On a phone with a display and in good situations, one may know which phone is ringing, but only when the destination phone rings. . .

Nowadays, there are essentially three different situations which can occur, as mentioned below.

Situation 1:

The user has a normal telephone without any indication about the called number. This is the most current situation.

Situation 2:

The user has a telephone with "Busy Lamp Field" functionality, allowing him to know if some other sets are idle or busy from a telephony point of view. This may give him some information on whether a call to these persons will ring their phone or not, but without being sure.

Situation 3:

Usually through a CTI (Computer Telephony Integration) application, the user may have the following information about other phones:

State of the phone: idle, ringing, busy, out of service . . .

State of the forwarding situation: no active forwarding, immediate forwarding to XXX, forward on no answer to XXX, forward on busy to XXX, "Do Not Disturb" . . .

Although the solution provided in situation 3 is the best one known, this solution cannot be considered as being satisfactory as this solution is indeed not available to most of the subscribers, but only for those using a CTI application, that means using a computer.

Furthermore, in none of the exposed situations, not even the most sophisticated solution 3, is the caller systematically and reliably informed in advance which phone/or groups of phones, will ring when he calls a given number.

SUMMARY OF THE INVENTION

It is a purpose of the present invention to overcome the aforementioned limitation and to solve the problem resulting from the present state of the art.

To this effect, the present invention concerns a method to perform a telecommunication between a caller terminal and a callee terminal identified by an identification code, such as a phone number, characterized in that it comprises the steps of:

collecting routing information related to the identification code of the callee, after entering said code at the caller's terminal and before activating the telecommunication or establishing the telecommunication link;

then displaying at least a part of said collected routing information at the caller's end, for example directly on the caller terminal;

and finally either activating the telecommunication in order to establish the telecommunication link corresponding to the entered code or cancelling the current attempt to establish a telecommunication link based on said dialed code.

Thus, the basic idea of the invention is to provide the caller with the information of which phone (or group of phones) will ring immediately (or after some timeout) when he dials a given number.

It should be noted that at the callee's end, the destination terminal can be either a single terminal or a group of terminals.

With the inventive features, it is possible to solve the annoying situation for the caller of not knowing who will be answering his call, by giving him a preview of the destination phone (or group of phones) that will ring immediately or after some timeout, but without establishing the phone call itself. By knowing in advance which phone will ring, the caller can decide whether or not to start the real call.

The concerned dialed telecommunication can be activated either in a manual way, by a further action performed on said caller terminal, for example by further pressing a determined key on the caller terminal, or in an automatic way (automatic launch of the call), by automatically activating the dialed telecommunication after a given timeout following the dialing.

In addition to the two previous embodiments, the method of the invention can also make provision for the concerned dialed telecommunication being automatically cancelled in the absence of any further action performed on said caller terminal during a given time out after dialing.

According to the user's wishes, various information can be displayed, upon programming, at the caller's end.

Thus, the information displayed at the caller's end can, for example, only comprise information concerning the callee's end, such as the identification of the other end terminal which would be actually involved in establishing the telecommunication link of said dialed telecommunication is activated, or of the person to whom said other end terminal belongs.

Alternatively, the information displayed at the caller's end can comprises the identification of all the terminal(s) and/or other intermediate telecommunication device(s) which would be involved in the telecommunication link if said dialed telecommunication is activated, and possibly their respective status and their mutual connections and relationships.

The present invention also concerns a telecommunication comprising a visual and/or audio display means and adapted to perform the method described herein before and, furthermore, also a telecommunication system able to link together a plurality of such telecommunication terminals, comprising one telecommunication network adapted for connection with one or several other telecommunication network(s), and managed by a corresponding network controller, wherein said telecommunication system is further adapted to perform the method according to the invention.

As the person skilled in the art will realize, the invention can be implemented in connection with any type of telecommunication terminal (mobile, fixed, computer based, . . . ), the visual display means being a computer screen, a mobile screen or similar and the audio display means being the earphone or earpiece of the phone, a loudspeaker or similar.

DETAILED DESCRIPTION OF PREFERRED EMBODIMENTS

The practical implementing of the invention will now be described in relation with the previously exposed present situations 1, 2 and 3.

If the phone system has already a feature level as described in situation 3, the dialing destination preview feature of the invention may be easily provided by combining the different individual information of each phone that would be involved in the call.

EXAMPLE

A wants to call B. B has activated an immediate forward to C, C has activated a forward on busy to D and C is currently busy in a call, D has activated a forward on no response for 10s to his mobile set.

Thus the dialing destination preview feature may give the following information on the display means: "dialing the number of B, will ring immediately D and then the mobile phone of D, after 10s".

If the phone system does not already have the feature level described in situation 3 above, the dialing destination preview feature of the invention may be provided either by:
  implementing the feature level of situation 3
  implementing a feature that gives the final destination when dialing a given number. This feature may already be implemented in some manner because the phone system has to compute the final destination anyway to establish the call.

Thus, the inventive method can be exploited on three different hardware embodiments, in connection with telephone calls.

1. Phone with visual display.

The user dials a destination number as usual: with keypad, with direct call key, etc. . . . When dialing is finished, the phone system indicates the phone that will ring to the user in a simple manner through the phone display: "Destination: Phone D".

The user has then the choice to either:
  cancel the call: by going on-hook or by pressing a 'Cancel' key
  start the call immediately by pressing a 'Send' key
  wait for a timeout after which the call is started automatically.

It is possible to activate the 'dialing destination preview' feature for each phone separately, and the timeout can also be set separately.

2. Phone without visual display.

The caller dials a destination number as usual on his terminal. When dialing is finished, the phone system indicates the phone that will ring if the call is established, by a vocal message through the earphone or the loudspeaker such as: "You will ring the phone number XXXX . . . " or "You will ring the phone of Mr XXXX . . . ".

The user, after having listened to said message, can act as described in case 1 before.

3. PC application.

A CTI application may use the same mechanism as described above, but can also take advantage of some PC specific nice features.

For example, if the PC application offers some programmable direct call buttons (which is often the case), the dialing destination preview may be given to the user by a tooltip when the mouse cursor comes over such a direct call key button. This is even more convenient for the user because the number of clicks he has to do, without the 'dialing destination preview' feature and with it, to start a call is the same.

Taking into account the foregoing description, the main advantage of the invention may be resumed as follows: by knowing which phone will ring when dialing a given number, the user may decide not to start the real call.

For example:

A wants to call B, but B is forwarded to his secretary C or to his voice mail. If A wants to speak to B only, and if A knows that his call will go to C or to the Voice Mail, then A may decide not to start the real call.

This general advantage induces several secondary advantages such as:
  the caller will not lose time in setting up a useless call
  the caller will not have to pay the bill of the call
  the ringing correspondent is not disturbed (e.g. the secretary C in the example above)
  the telephony system or network has less traffic to treat.

The present invention is, of course, not limited to the preferred embodiments described herein, as changes can be made or equivalents used without departing from the scope of the invention.

The invention claimed is:

1. A method of performing a telecommunication, in a telecommunication system, between a caller terminal and a callee terminal identified by an identification code, said method comprising:
  initiating an operation of collecting routing information, from the telecommunication system, related to the identification code of the callee terminal, after entering said identification code at the caller's terminal and before one of activating the telecommunication and establishing a telecommunication link;
  displaying at least a part of said collected routing information at the caller terminal; and
  activating the telecommunication in order to establish the telecommunication link corresponding to the entered identification code or cancelling a current attempt to establish the telecommunication link based on said dialed identification code,
  wherein said routing information is generated only after entering said identification code at the caller's terminal and before one of activating the telecommunication and establishing a telecommunication link, and
  wherein the information displayed at the caller terminal comprises identification of all the terminal(s) and other intermediate telecommunication device(s) which would be involved in the telecommunication link if a dialed telecommunication is activated, and their respective status and their mutual connections and relationships.

2. The method according to claim 1, wherein a concerned dialed telecommunication is activated by a further action performed on said caller terminal.

3. The method according to claim 2, wherein the concerned dialed telecommunication is activated by further pressing a determined key on the caller terminal.

4. The method according to claim 1, wherein a concerned dialed telecommunication is automatically activated after a predetermined time following a dialing.

5. The method according to claim 1, wherein the concerned dialed telecommunication is automatically cancelled in the absence of any further action performed on said caller terminal during a predetermined time after dialing.

6. The method according to claim 1, wherein the information displayed at the caller terminal only comprises information related to the callee terminal.

7. The method according to claim 6, wherein said information related to the callee terminal comprises at least one of identification information of another end terminal which would be involved in establishing the telecommunication link and a person to whom said another end terminal belongs.

8. The method according to claim 1, wherein a telecommunication terminal comprises a visual and/or audio display means.

9. Telecommunication system able to link together a plurality of telecommunication terminals according to claim 8, comprising one telecommunication network adapted for connection with one or several other telecommunication network(s), and managed by a corresponding network controller.

10. The method according to claim 1, wherein said routing information related to the identification code of the callee terminal is not previously stored.

* * * * *